April 26, 1966  R. E. PRICE ETAL  3,247,619

MACHINE FOR GRINDING PISTONS AUTOMATICALLY

Filed June 6, 1963  5 Sheets-Sheet 1

INVENTOR
RALPH E. PRICE
BY JOHN R. FRIES
ATTORNEY

United States Patent Office 3,247,619
Patented Apr. 26, 1966

3,247,619
MACHINE FOR GRINDING PISTONS
AUTOMATICALLY
Ralph E. Price and John R. Fries, Waynesboro, Pa., assignors to Landis Tool Company, Waynesboro, Pa.
Filed June 6, 1963, Ser. No. 285,985
24 Claims. (Cl. 51—101)

This invention relates to machines for grinding non-cylindrical workpieces such as cams having one or more points of maximum diameter and more particularly, elliptical workpieces such as automotive pistons.

Pistons are generally ground on a form of cam grinder in which the piston is oscillated toward and from a grinding wheel in accordance with the contour of a master cam generally rotating co-axially with the piston, both of which are supported on a cradle. The cradle is oscillated by rotation of the master cam against a fixed follower roller. Such master cams are generally expensive because of the accuracy required for each point in the contour. Any error in the master cam is transmitted directly to the workpiece. In the case of pistons, it may be desirable to make slight changes in the major or skirt diameter. In present piston grinders, this requires a different master cam for each work size.

It is, therefore, an object of the present invention to provide means whereby certain dimensions of the workpiece can be changed without changing the pattern or master.

Another object is to provide an increment feed operable in time with work rotation and during the interval when the work and wheel are not in contact.

Another object is to provide a gage and means to stop the grinding operation only after said gage has indicated that both points on the measured diameter are the right size.

Another object is to provide means for stopping the work drive spindle in a predetermined angular position in accordance with the angular position in which the workpiece is placed in the machine.

Automotive pistons being rather flexible in structure, are subject to deformation during a grinding operation. A certain amount of deformation is caused by the grinding pressure, but this can be controlled by controlling the rate of grinding feed. Most deformations are caused by the method of supporting the piston for a grinding operation. General practice is to support the piston between centers or between a chuck and a center. With these holding means, pressure is necessarily exerted axially on the workpiece in order to support said workpiece with sufficient rigidity against the forces exerted by the grinding wheel. However, these holding forces also deform the piston. The piston is ground to the desired shape and size while so deformed and when the pressure is released, the shape and size of the piston change.

Another object is to provide means for eliminating deformation of a piston by the holding means.

The most rigid portion of the piston is the head. Since we are concerned only with the grinding of the skirt of the piston, the head is available for applying a holding means.

It is another object to provide a chuck having sufficient gripping power to hold the piston with the same rigidity as would be provided by supporting it at both ends.

Another object is to provide means for arranging chucking jaws to engage the piston at such points that any deformation of the head resulting from the great pressure required for chucking, will not be transmitted to the portion of the piston being ground.

Wheel support 11 is slidably mounted on base 10. Grinding wheel 15 is rotatably mounted on wheel support 11. Motor 20 drives grinding wheel 15 through a belt (not shown).

The means for rotatably supporting workpiece W consists of a support member 30 on which cradle 31 is mounted to oscillate on pivotal supports 22 at each end of cradle 31.

Work spindle 40 is rotatably supported in bearings (not shown) in cradle 31. The head end of workpiece W is held in a diaphragm chuck 47 on spindle 40. Workpiece W has a rigid head portion, flexible, peripherally spaced skirt portions and slots separating said head portion and said skirt portions. Jaws 39 on chuck 47 are arranged to grip the head portion of workpiece W in angularly spaced positions corresponding to said slots and skirt portions. The slots prevent any deformation of the head portion by jaws 39 from being transmitted to the skirt portions. Chuck 47 provides the sole support of workpiece W during a grinding operation, thus avoiding deformation of the workpiece often caused by support members engaging the other end of the workpiece.

Spindle 40 has a master cam 41. Master cam follower 42 is rotatably mounted on arm 43 pivotally supported by means of shaft 45 which is rotatably mounted in support member 46. The location of pivot shaft 45 between roller 42 and spring 55 is such that there is a substantial reduction ratio between master cam 41 and workpiece W. Plate 50 is attached to arm 43 for vertical adjustment by means of screws 51 and slot 52 in arm 43. The upper end of plate 50 has mounted thereon one end of leaf spring 55. The distance between the axis of follower 42 and the axis of shaft 45 is much greater than the distance between the axis of shaft 45 and spring 55. The lift of master cam 41 is several times greater than the lift of workpiece W so that a high degree of precision is obtained in the finished workpiece. Vertical adjustment of plate 50 changes the ratio between master cam 41 and workpiece W so that the lift of the piston may be changed without changing the master cam. It should be noted that the position of spring 55 and shaft 45 may be reversed and a positive master cam substituted for the inverted master cam 41. The other end of leaf spring 55 is attached to lug 23 on cradle 31. The space on spring 55 between plate 50 and lug 23 has a stiffening member 56 attached thereto to prevent buckling of spring 55. Leaf spring 57 at right angles to spring 55 has one end attached to member 56 and the other end to lug 23.

Master cam 41 is held against follower 42 by means of spring 60 supported on rod 61 which is mounted in lug 62 on support member 46. Spring 60 bears at one end against lug 23 on cradle 31, and at the other end against the washer 67. The load on spring 60 may be adjusted by means of a pair of nuts 65 and 66 and washer 67 on rod 61.

The means for effecting precision vertical adjustment of plate 50 consists of a portion 54 extending between a pair of oppositely disposed adjusting screws 70 and 71 in bracket 72 attached to arm 43. Spring 80 attached at one end to bracket 72 and the other end to support member 46, serves to urge arm 43 and follower 42 in a counter-clockwise direction to hold follower 42 firmly in contact with master cam 41.

Ram 100 having a pair of locating pins 101 for engaging corresponding holes (not shown) in workpiece W, is moved endwise by lever 102 to push workpiece W into chuck 47 and at the same time, through pins 101 to assure proper angular position of workpiece W relative to master cam 41.

Figure 1:
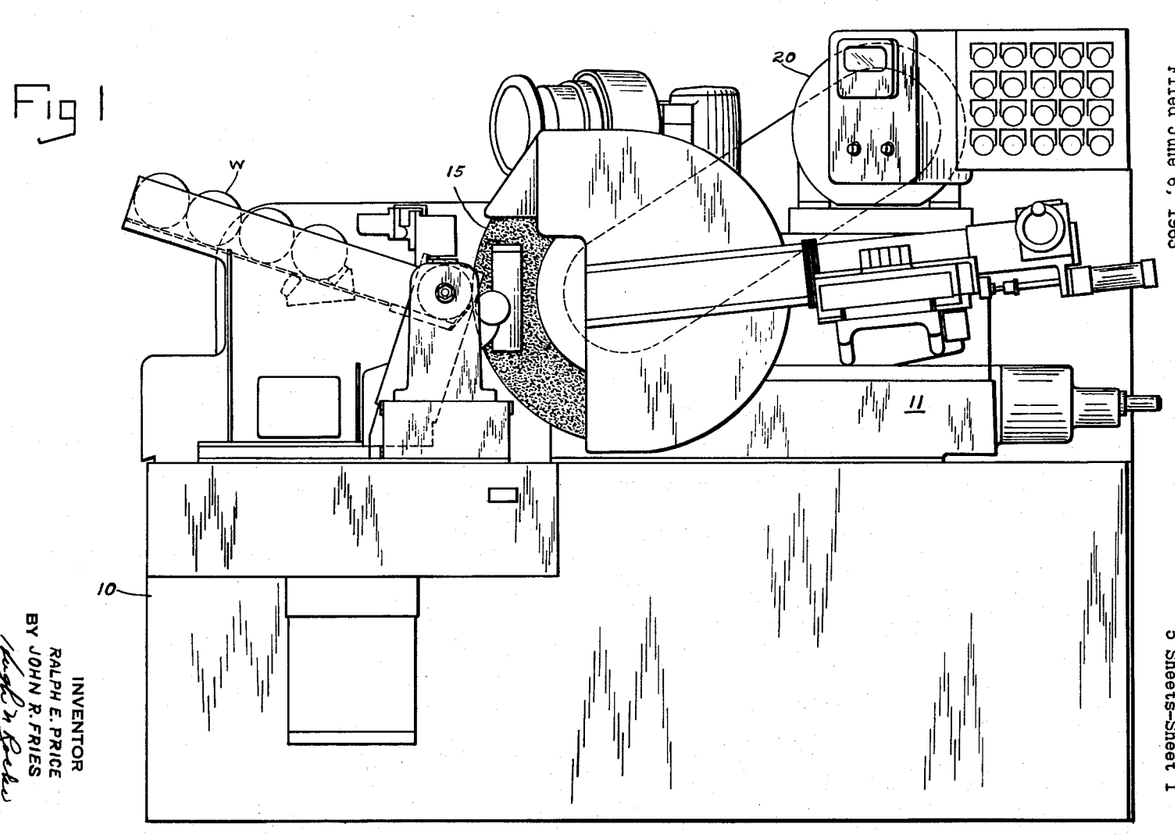
FIG. 1 is a right hand end view of a machine for grinding automotive pistons.
Figure 2:
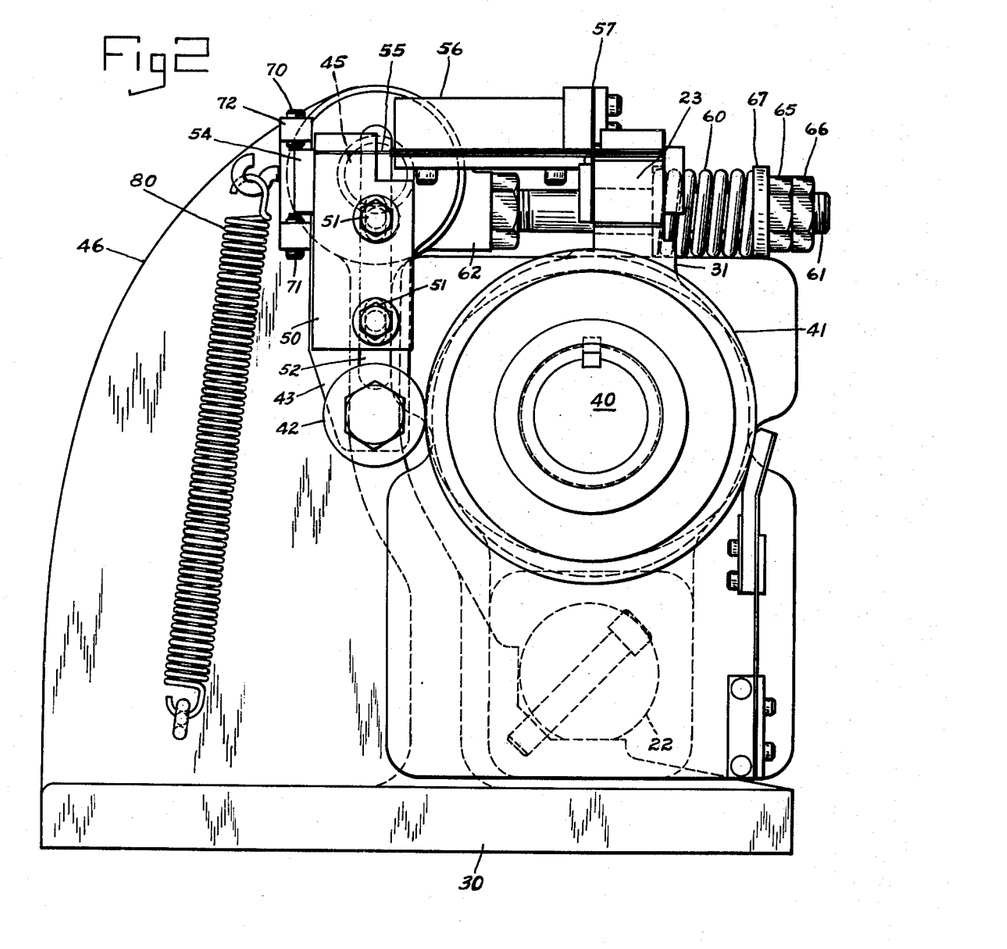
FIG. 2 is a left hand end view of the headstock or work drive assembly.
Figure 3:
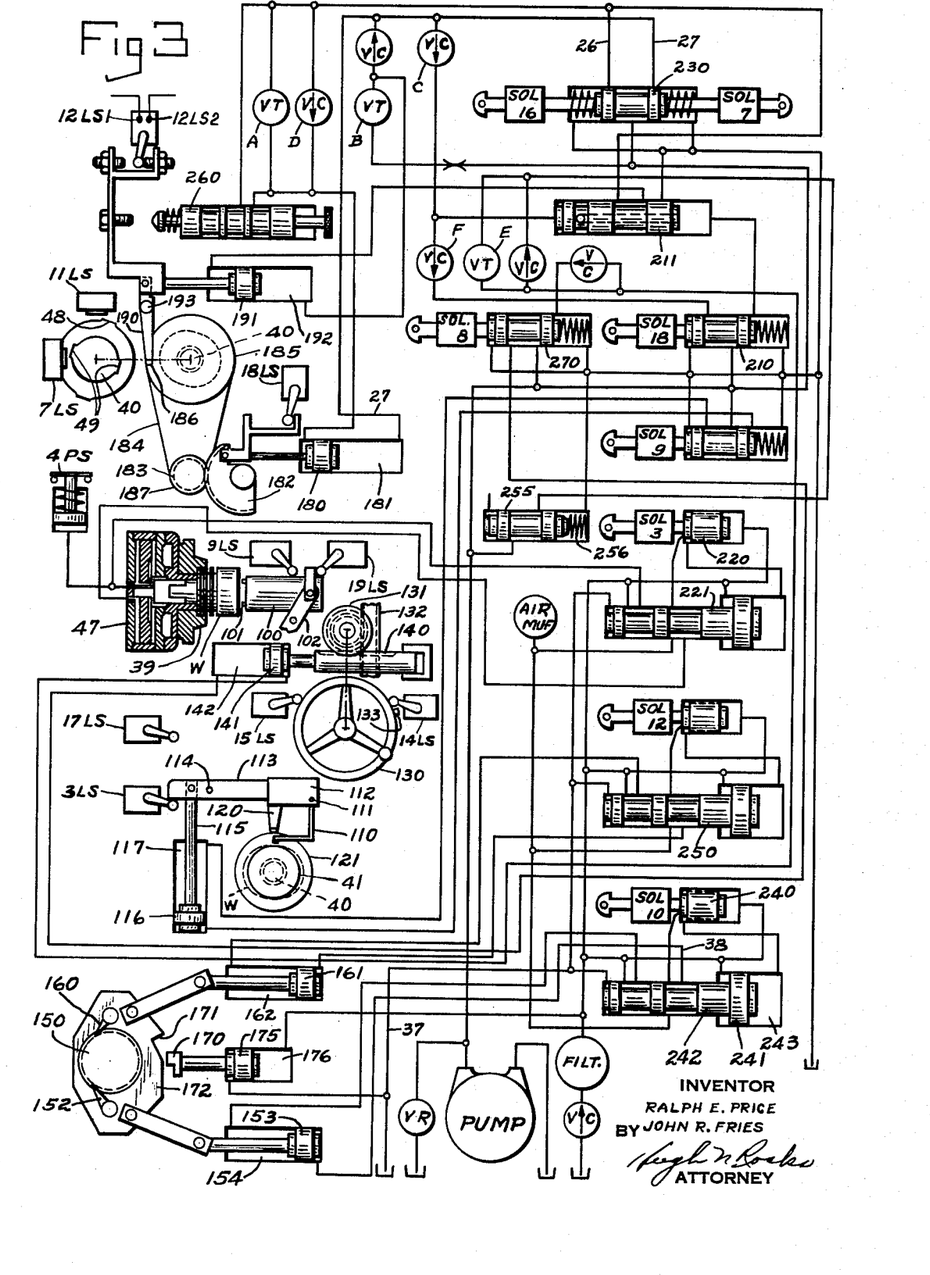
FIG. 3 is a hydraulic diagram.
Figure 4:
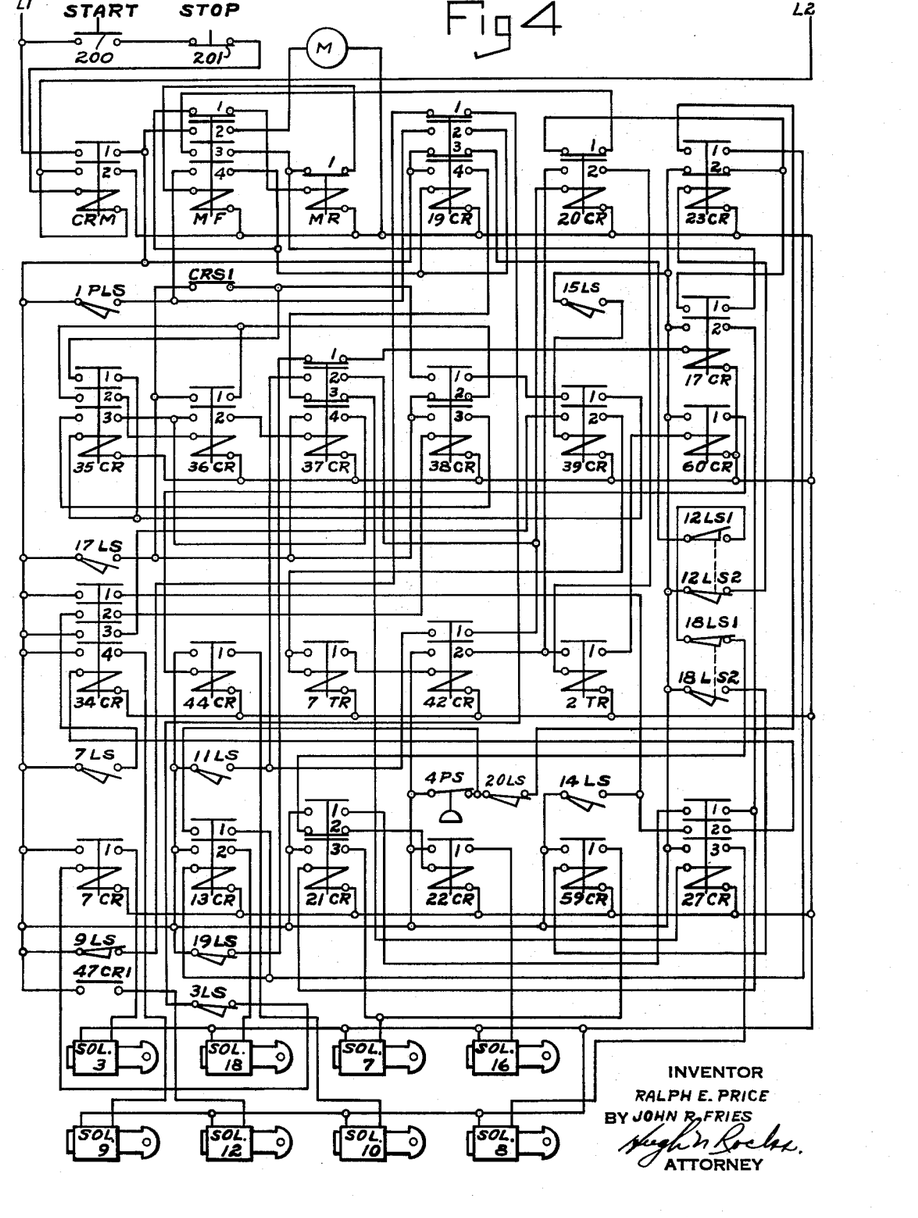
FIG. 4 is an electrical diagram.
Figure 5:
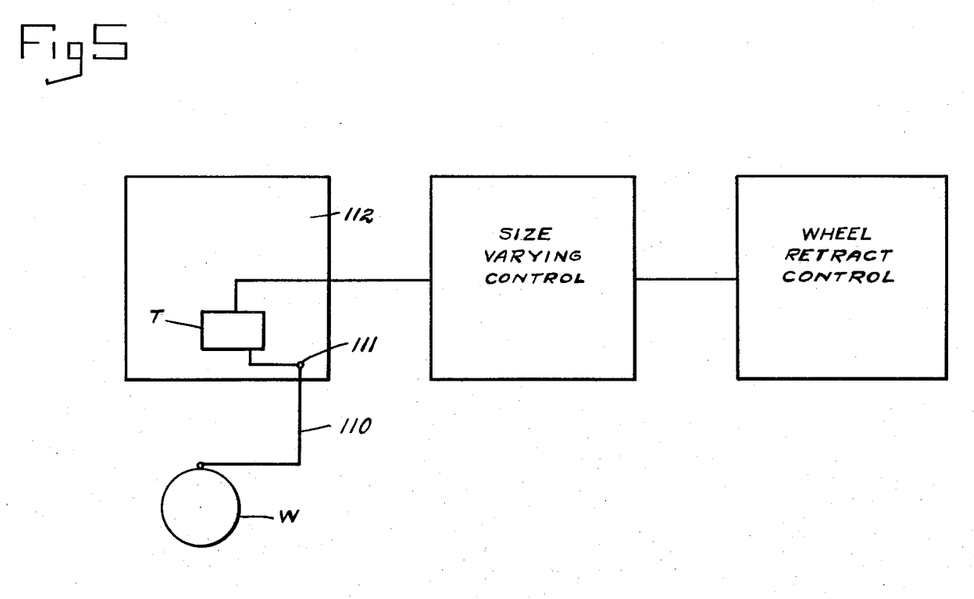
FIG. 5 is a block diagram showing the elements of the size control device.

The sizing gage consists of a feeler member 110 pivotally mounted on the underside of gage 112 which, in turn, is mounted at one end of arm 113. Feeler 110 is attached to a variable differential transformer or transducer I. Control means are provided for varying the size of workpieces above or below a specified size to conform to assembly requirements. The means for varying the size of a workpiece consists of a size varying control between gage 112 and the wheel retract control means. The size varying control, shown diagrammatically in FIG. 5, may be any suitable means for making the transducer T responsive to a work size slightly greater or less than the dimension specified for the workpiece, and to actuate the wheel retracting control accordingly to stop the grinding operation. Arm 113 is pivotally supported at 114. The other end of arm 113 is attached to piston rod 115 in piston 116 in cylinder 117. Movement of gage 112 and feeler 110 in the direction of workpiece W is limited by shoe 120 arranged to ride on cylinder guide member 121. This holds gage 112 in predetermined relation to spindle 40 and workpiece W. It also prevents feeler 110 from contacting the minor diameter of workpiece W and limits the range of radial movement of feeler 110 to slightly more than the amount of stock removed on the radius during finish grinding.

When feeler 110 first engages the oversize workpiece, it maintains contact with said workpiece over the greater portion of the surface being ground because the skirt of an underground piston is cylindrical. Since this portion of the finished piston is not cylindrical, the duration of contact between feeler 110 and the work surface becomes shorter as the final size and contour is approached.

The downward movement of feeler 110 about its pivot 111 is limited. When the work has been ground to a point where feeler 110 no longer actuates the transducer T to open gage contact CRS1 in time with the rotation of the work, said contact remains closed and thereafter when limit switch 7LS is closed in the circuit with said gage contact, relay 37CR is energized, to cause retraction of wheel support 11 and gage 112.

Means for advancing wheel support 11 and grinding wheel 15 for a grinding operation includes a feed hand wheel 130 and other well known elements including a vertical shaft 131 having a pinion or worm wheel (not shown) at its lower end for engaging feed screw 132. Power operation of hand wheel 130 and shaft 131 is effected by the hydraulically operated rack 140 connected to piston 141 in cylinder 142.

The means for effecting increment feed of grinding wheel 15 consists of a reversible ratchet 150 connected to feed screw 132 and operable in a clockwise direction by means of feed pawl 152 actuated by piston 153 in cylinder 154. Feed screw 132 is actuated in a counter-clockwise direction by pawl 160 and piston 161 in cylinder 162. The extent of clockwise increment is determined by stop member 170 in the path of stop surface 171 on plate 172. Stop member 170 is held in the position shown by piston 175 in cylinder 176. The feed mechanism may have a gear ratio such that feed increments correspond to the increments of size adjustment.

The means for initiating operation of the incremental feed includes a proximity tappet switch 11LS primarily used to stop spindle 40 in a predetermined angular position. In this case, the intermittent energizing and deenergizing of limit switch 11LS by actuator 48 for each revolution of spindle 40, is used also to actuate the incremental feed mechanism.

When workpiece W is ground to size, gage 112 and sizing proximity switch 7LS, which is energized by actuators 49 on spindle 40, cooperate to stop the grinding operation by retracting grinding wheel 15 only after both major diameter portions of workpiece W have passed feeler 110 without opening gage contact CRS1. The angular position of actuators 49 on spindle 40 is such that grinding wheel 15 is retracted while the minor diameter of workpiece W is adjacent grinding wheel 15 rather than when the major diameter portion of the workpiece is in contact with grinding wheel 15.

At the end of the grinding operation, it is desirable to stop spindle 40 in a predetermined angular position to receive an unground workpiece. This is accomplished when grinding wheel 15 is retracted and when actuator 48 on spindle 40 is in position to actuate limit switch 11LS. By this means, spindle 40 stops in an approximate position which is short of the desired work receiving position. Spindle 40 is then rotated slowly in the same direction by a positioning device which consists of piston 180 in cylinder 181. Piston 180 is connected to rotate gear segment 182 which drives pinion 183. Pinion 183, in turn, drives through a one-way clutch in pulley 187 which is connected through belt 184 to spindle 40. Stop cam 185 on spindle 40 has a radial stop surface 186 which is engaged by stop pawl 190 to stop spindle 40 in the desired work receiving position.

The means for actuating stop pawl 190 consists of piston 191 in cylinder 192. Piston 191 is connected to one end of stop pawl 190 which is pivoted at 193, to move pawl 190 into and out of the path of stop surface 186 on cam 185.

Operation

The machine is started by closing start switch 200 which completes a circuit through normally closed stop switch 201 to energize relay CRM.

Relay CRM contacts in lines L1 and L2 energize the control panel.

The following circuits are completed when the control panel becomes energized.

Normally closed gage retract limit switch 3LS and normally closed relay contact 19CR1 provide a circuit to energize unchuck relay 7CR and relay contact 7CR1 to energize unchuck solenoid 3 to open chuck 47.

Radial stop limit switch contact 12LS2 is held closed to energize relay 23CR.

Relay contact 23CR1 closes in the circuit from normally closed pressure switch 4PS to energize relay 13CR and solenoid 18.

Limit switch 20LS closes when workpiece W is placed in the machine to complete a circuit to energize solenoid 18.

Relay contact 13CR1 is a holding contact.

Relay contact 13CR2 closes to energize solenoid 18.

Solenoid 18 shifts valve 210 to the right to direct fluid under pressure to the right hand end of pressure operated radial stop reset pilot valve 211 to shift said valve to the left to direct fluid from valve 230 through line 26 to the rod end of stop piston 191 which holds stop pawl 190 in in-operative position when valve 230 is shifted to the left by solenoid 7.

A contact (not shown) of relay 13CR causes ram 100 to advance to shift workpiece W into chuck 47.

Normally closed limit switch 9LS opens when ram 100 advances, deenergizing unchuck relay 7CR and unchuck solenoid 3.

Valves 220 and 221 are shifted to the left to close chuck 47.

Locating pins 101 on ram 100 hold workpiece W in proper angular position relative to master cam 41 until said workpiece is gripped by chuck 47.

Pressure switch 4PS opens due to pressure on chuck 47, deenergizing relay 13CR to retract ram 100 and also deenergizing solenoid 18.

Solenoid 18 releases valve 210 which is shifted to the left to direct fluid under pressure to prevent flow of fluid pressure through check valve F to provide pressure at the left end of valve 211 to shift said valve to the right.

Ram retract limit switch 19LS closes in a circuit through normally closed relay contact 37CR1 to energize relay 17CR.

Relay contact 17CR2 closes in a circuit to energize relay 21CR.

Relay contact 21CR1 is a holding contact.

Normally closed relay contact 21CR2 opens to prevent energizing of radial stop and positioning control relay 22CR.

Relay contact 21CR3 energizes reset solenoid 7.

Reset solenoid 7 shifts positioning valve 230 to the left, directing fluid through line 26 and check valve D to the rod end of positioning cylinder 181 to reset gear segment 182. Fluid from valve 230 also passes through line 26 and pressure operated radial stop reset pilot valve 211 to the rod end of stop cylinder 192 to reset stop pawl 190 against the lower constant pressure in the head end of cylinder 192.

Normally closed relay contact 23CR2 is closed in the circuit to work drive motor relay MF.

Relay contact 17CR1 closes to energize work drive motor relay MF.

Contact MF1 is a holding contact.

Contact MF2 closes to energize work drive motor M.

When motor M rotates, plugging switch 1PLS closes to complete a circuit through contact MF4 to energize relay 19CR.

Normally closed contact MF3 in the circuit to motor reverse relay MR is open when motor M is running.

Relay contact 19CR2 is a holding contact.

Normally closed relay contact 19CR3 opens in the circuit to radial stop and positioning control relay 22CR to prevent operation of the positioning device while workpiece W is rotating for a grinding operation.

Relay contact 19CR4 closes to complete a circuit through normally closed relay contact 37CR3 to energize infeed relay 27CR to advance grinding wheel 15.

Normally closed relay contact 19CR1 opens in the circuit to unchuck relay 7CR to keep chuck 47 closed.

Relay contact 27CR1 is in a holding circuit with contact 21CR1 for radial stop and positioning reset control relay 21CR.

Relay contact 27CR2 is in a circuit with gage relay contact 34CR1 to relay 34CR and parallel with gage limit switch 14LS.

Relay contact 27CR3 closes in a circuit to energize infeed solenoid 8.

Solenoid 8 shifts valve 270 to the right to direct fluid to a rapid feed cylinder (not shown).

The exhaust fluid from the rapid feed is connected to hold valve 255 in right hand position to prevent fluid under pressure from reaching the rod end of feed cylinder 142.

As soon as the rapid feed movement is completed, the exhaust pressure drops to zero and valve 255 is shifted to the left by spring 256, directing fluid under pressure through throttle valve E to the rod end of feed cylinder 142, moving piston 141 to the left to actuate the hand wheel feed mechanism to advance grinding wheel 15 for a grinding operation.

The rate of feed is determined by the setting of throttle valve E.

At a predetermined point in the grinding operation, gage limit switch 14LS is actuated by cam 133 on feed hand wheel 130 to complete a circuit through relay contact 27CR2 to energize gage relay 34CR.

Grinding wheel 15 advances and grinds until gage limit switch 14LS is actuated by cam 133 on hand wheel 130 to energize gage relay 34CR.

Relay contact 34CR1 is a holding contact.

Relay contact 34CR2 is in a circuit from sizing proximity limit switch 7LS to relay 38CR.

Relay contact 34CR3 is in a circuit with relay contact 39CR2 and timer relay contact 7TR1 to relay 42CR.

Relay contact 34CR4 completes a circuit to energize gage solenoid 9.

Solenoid 9 moves to the right to direct fluid under pressure to the lower end of gage cylinder 117.

Gage piston 116 moves upwardly to rotate gage arm 113 about pivot 114 to place feeler 110 in contact with workpiece W.

Shoe 120 attached to gage 112 engages cylindrical guide member 121 rotatable with master cam 41 to limit the movement of gage 112 in the direction of workpiece W.

Shoe 120 and guide member 121 permit feeler 110 to engage only the major diameter of workpiece W, i.e. the portions being ground.

Movement of gage 122 opens gage retract limit switch 3LS and closes gage advance limit switch 17LS.

The circuit to unchuck relay 7CR which includes gage retract limit switch 3LS was opened by normally closed relay contact 19CR1 when motor M was started so that chuck 47 is kept closed during work rotation.

Gage advance limit switch 17LS makes normally closed gage contact CRS1 operable in the combination circuit which controls relay 37CR.

The feed continues until feed completion limit switch 15LS closes to energize feed completion control relay 39CR.

Relay contact 39CR1 closes in the circuit to relay 35CR.

Relay contact 39CR2 closes in a circuit with previously closed relay contact 34CR2 to energize sparkout timer relay 7TR.

At the end of the sparkout period, sparkout timer relay 7TR times out and contact 7TR1 closes to energize relay 42CR.

Relay contact 42CR1 closes in the circuit from proximity tappet limit switch 11LS to energize work tapped switch control relay 20CR intermittently.

Relay contact 42CR2 closes to complete a circuit through relay contact 20CR2 to energize incremental timer relay 2TR each time relay contact 20CR2 closes.

Timer relay contact 2TR1 closes to complete a circuit from relay contact 42CR2 to energize relay 60CR.

Relay contact 60CR1 completes a circuit to energize incremental control relay 44CR and incremental solenoid 10 each time limit switch 11LS is closed, to provide a feed increment for each turn of the work and when said work is in a predetermined angular position, i.e. with a minor diameter of workpiece W adjacent grinding wheel 15.

Proximity tappet limit switch 11LS is positioned to be closed by actuator 48 once for each turn of workpiece W when the minor diameter portion is adjacent grinding wheel 15. Thus, each feed increment is completed before the skirt of workpiece W engages grinding wheel 15.

When incremental solenoid 10 is energized, it moves to the right to cut off the fluid entering the solenoid operated pilot valve 240.

Pressure is then exerted on piston 241 operating incremental valve 242, shifting said valve to the right and directing fluid through line 38 to the head end of cylinder 154 from the pressure connection which shifts piston 241 and valve 242 to the right, thus providing one feed increment to rotate feed screw 132.

When actuator 48 passes limit switch 11LS, the circuit to relay 60CR is held by incremental timer relay contact 2TR1 until the incremental elements can function.

When timer relay contact 2TR1 times out, said contact opens, relay 60CR is deenergized, and incremental solenoid 10 is deenergized and pressure at the end of pilot valve 240 shifts said valve to the left, blocking the exhaust and directing fluid under pressure to the right hand end of feed valve operating cylinder 243, shifting valve 242 to the left.

In the left hand position of valve 242, line 38 is connected to exhaust and line 37 is connected to pressure to retract feed pawl 152 in preparation for the next feed increment.

When gage 112 is advanced toward workpiece W, guide shoe 120 attached to gage 112 rides on cylindrical guide member 121 rotatable with master cam 41 which permits feeler 110 to contact only the high portions of workpiece W.

Both skirts or high points of a piston must be ground to size to stop the grinding operation.

Each skirt, so long as it is oversize, will operate through feeler 110 and gage 112 to open gage contact CRS1 each time it passes gage 112 and will hold said contact open, at first, for an interval corresponding approximately to the width of the skirt. As the work becomes smaller, the interval, during which the contact remains open, also becomes smaller.

At about the same time that a high point or skirt opens gage contact CRS1, sizing proximity limit switch 7LS is actuated by actuators 49 rotating with workpiece W to close relay contact 38CR1 in the circuit with gage contact CRS1.

Relay contact 39CR1 in the same circuit, is closed upon feed completion.

When all contacts in the circuit are closed, relay 35CR is energized and held by relay contact 35CR1.

So long as both skirts are oversize, when limit switch 7LS closes contact 38CR1, gage 112 opens contact CRS1 and the circuit will be broken at the normally closed gage contact CRS1 each time a skirt passes the gage or twice for each turn of workpiece W. During the intervals between the twice per revolution actuation of proximity limit switch 7LS by actuators 49, the gage circuit is opened at this point so that even though feeler 110 drops to a position below finished size on the minor diameter of the workpiece, the gage circuit cannot be completed to stop the grinding operation until both limit switch 7LS and relay CRS1 are closed at the same time.

Each time relay 35CR is energized, relay contact 35CR2 closes in the circuit to relay 36CR.

However, when relay contact 38CR1 closes in the circuit to relay 35CR, normally closed relay contact 38CR2 opens in the circuit to relay 36CR so that said relay will not remain closed until at least one skirt of workpiece W has reached size and thus fails to open gage contact CRS1.

At this time, relay 35CR will remain energized and as soon as relay 38CR is deenergized by opening limit switch 7LS, normally closed relay contact 38CR2 will close to energize relay 36CR.

Relay 36CR will be held by relay contact 36CR1.

At this point, relay contacts 35CR3 and 36CR2 are closed in the circuit to relay 37CR, leaving relay contact 38CR3 open in said circuit.

If the next skirt is also to size, gage contact CRS1 will remain closed, relays 35CR and 36CR will remain energized, and relay contacts 35CR3 and 36CR2 will remain closed in the circuit to relay 37CR.

The next time relay 38CR is energized by limit switch 7LS, relay contact 38CR3 will complete a circuit to relay 37CR.

Relay contact 37CR4 will hold the circuit.

As described elsewhere, energizing relay 37CR retracts grinding wheel 15 and stops the grinding operation.

If one skirt is to size and the other skirt is still oversize, the oversize skirt will open gage contact CRS1, deenergizing both relays 35CR and 36CR, thus preventing retraction of grinding wheel 15 until the oversize skirt has been ground to a point where it no longer opens gage contact CRS1.

Normally closed relay contact 37CR3 will open to deenergize infeed relay 27CR and infeed solenoid 8 and retract grinding wheel 15.

Relay contact 27CR2 opens in the circuit to radial stop and positioning reset relay 21CR, deenergizing solenoid 7 and permitting valve 230 to return to center position.

Relay contact 27CR3 opens to deenergize gage relay 34CR.

Feed completion limit switch 15LS opens to deenergize feed completion relay 39CR.

Relay contact 39CR1 opens to deenergize relay 35CR and consequently relays 36CR and 37CR.

Relay contact 39CR1 opens in the circuit to sizing relay 35CR to prevent energizing relay 35CR by sizing proximity limit switch 7LS until relay contact 39CR1 is closed again by feed completion limit switch 15LS and until gage 112 advances for the next workpiece.

Relay contact 34CR2 closes in the circuit to relay 38CR, and gage advance limit switch 17LS closes to render operable the size control and wheel retract relays 35CR, 36CR, 37CR and 38CR.

Relay contacts 34CR3 and 39CR2 open to deenergize relay 42CR.

Relay contact 34CR4 opens to deenergize gage solenoid 9 and retract gage 112, closing gage retract limit switch 3LS.

Gage advance limit switch 17LS is opened to cut off power to the size control and wheel retract circuits.

Relay contact 42CR1 opens one of two parallel circuits to work tappet switch relay 20CR.

Relay contact 42CR2 opens to stop the incremental by deenergizing relays 2TR, 60CR and 44CR.

Relay contact 44CR1 opens to deenergize incremental solenoid 10.

Incremental reset solenoid 12 is energized by means (not shown) to operate incremental reset valve 250 in the same manner as valves 240 and 242 actuated by incremental solenoid 10, except that reset piston 161 and pawl 160 turn feed ratchet 150 in a counter-clockwise direction.

When pressure is applied to open chuck 47, the other side of said chuck is connected to exhaust and pressure switch 4PS closes in the circuit to relay 13CR.

Limit switch 20LS closes when workpiece W is placed in operative position and completes a circuit to energize ram relay 13CR to advance ram 100 to shift workpiece W into chuck 47.

With relay 37CR energized to retract wheel support 11 and relay 42CR deenergized to indicate the end of the incremental feed and relay 34CR deenergized to retract gage 112, relay contact 42CR1 opens in the circuit to relay 20CR and contact 37CR2 closes in a parallel circuit to relay 20CR.

Work tappet switch control relay 20CR is energized and deenergized alternately by work tappet proximity switch 11LS.

Actuator 48 and spindle 40 are angularly positioned so that the small diameter of workpiece W is adjacent grinding wheel 15 when said grinding wheel is retracted.

Normally closed relay contact 20CR1 opens to deenergize work drive motor relay MF.

Normally closed relay contact MF1 closes in a circuit to motor reverse relay MR to apply a reverse current to stop motor M.

Normally closed contact MR1 opens in the circuit to motor relay MF.

As soon as motor M stops, plugging switch 1PLS opens to deenergize relays MR and 19CR.

When relay 27CR was deenergized by opening normally closed relay contact 37CR2, relay contact 27CR2 was opened to deenergize radial stop and positioning reset relay 21CR and solenoid 7.

Normally closed relay contact 21CR2 closes in a circuit with radial stop limit switch contact 12LS1 and positioner limit switch contact 18LS1 to energize radial stop and positioning relay 22CR.

Relay contact 22CR1 closes to energize stop and positioner solenoid 16.

When solenoid 16 is energized, stop piston 191 and positioner piston 180 are both in right hand or reset position.

Solenoid 16 shifts valve 230 to the right to direct fluid through line 27 to the head end of positioner cylinder 181.

At the same time, valve 230 connects the rod end of stop cylinder 192 to exhaust through radial stop reset valve 211.

The head end of stop cylinder 192 is connected to a constant pressure lower than the reset pressure in the rod end of cylinder 192, and with the rod end of said cylinder connected to exhaust, this lower pressure which is determined by reducing valve B, moves stop piston 191 to the left to position stop pawl 190 to release positioner delay valve 260 and to close limit switch contact 12LS2 when stop pawl 190 is in the path of stop surface 186.

Valve 260 moves to the left to cut off the exhaust from the rod end of positioner cylinder 181 and directs said exhaust through throttle valve A to cushion the positioning of spindle 40 and to give stop pawl 190 time to move into the path of stop surface 186 before said stop surface reaches stop position.

When stop surface 186 engages stop pawl 190, the leftward movement of positioner piston 180 and stop piston 191, is stopped.

Pressure in the head end of cylinder 181 builds up to the pressure for which check valve C is set, passing through said check valve and shifting valve 211 to the right connecting the rod end of cylinder 192 directly to exhaust.

Stop piston 191 continues to move to the left to position stop pawl 190 for engaging stop surface 186.

When stop surface 186 and stop pawl 190 meet, piston 191 has reached the end of its stroke to the left and limit switch contact 12LS1 opens the circuit to radial stop and positioning relay 22CR, deenergizing solenoid 16 and centering valve 230.

In this position, exhaust from the rod end of cylinder 192 which formerly passed through valve 211 in the left hand position and then through line 26 to exhaust through valve 230, now exhausts directly to the exhaust line through valve 211 in the right hand position.

Valve 211, keeping the rod end of cylinder 192 open to exhaust, assures piston 191 and stop pawl 190 of being held firmly in stop position.

When gage 112 is retracted, limit switch 3LS is closed in the circuit to unchuck relay 7CR.

Normally closed relay contact 19CR1 in the circuit to relay 7CR is closed when work drive motor M and plugging switch 1PLS open.

Limit switch 9LS in the circuit to relay 7CR was closed when ram 100 was retracted at the beginning of the grinding cycle.

Relay contact 7CR1 closes a circuit to energize unchuck solenoid 3.

Valves 220 and 221, actuated by solenoid 3, function in the same manner as valves 242 and 250, actuated by solenoids 10 and 12.

When unchuck solenoid 3 is energized, fluid is directed by valve 221 to open chuck 47 and release workpiece W.

Radial stop and positioning relay 22CR has been deenergized and valve 230 returned to center position, holding piston 191 and positioner piston 180 in left hand position with spindle 40 in the proper angular position to receive an unground workpiece.

Limit switch contact 18LS2 closes to energize relay 59CR.

Relay contact 59CR1 closes to energize reset solenoid 7 in case radial stop and positioning reset relay 21CR cannot be energized, such as when positioner piston 180 reaches the end of its stroke without stop surface 186 engaging pawl 190, to direct fluid under pressure through check valve D to reset piston 180 and through radial stop reset pilot valve 211 to reset piston 191 so that the positioning operation may be repeated.

We claim:

1. In a machine for grinding non-cylindrical workpieces, a grinding wheel support, a grinding wheel rotatably mounted on said wheel support, a work support comprising a housing, a work drive spindle rotatably mounted in said housing, means on said spindle for rotatably holding a workpiece in operative relation with said grinding wheel, a master cam on said spindle, a follower roller for engaging the contour of said master cam, a cradle for supporting said housing and spindle for oscillation in response to rotation of said master cam against said follower roller, means for supporting said follower roller comprising a fixed support member, a depending arm pivotally attached to said fixed support member, said follower roller being rotatably mounted at one end of said arm, and a flexible connection between the other end of said arm and a point on said cradle.

2. In a machine for grinding non-cylindrical workpieces, a grinding wheel support, a grinding wheel rotatably mounted on said wheel support, a work support comprising a housing, a work drive spindle rotatably mounted in said housing, means on said spindle for rotatably holding a workpiece in operative relation with said grinding wheel, a master cam on said spindle, a follower roller for engaging the contour of said master cam, a cradle for supporting said housing and spindle for oscillation in response to rotation of said master cam against said follower roller, means for supporting said follower roller comprising a fixed support member, a depending arm pivotally attached to said fixed support member, said follower roller being rotatably mounted on said arm, and a connection between said arm and a point on said cradle above said spindle.

3. In a machine for grinding non-cylindrical workpieces, a grinding wheel support, a grinding wheel rotatably mounted on said wheel support, a work support comprising a housing, a work drive spindle rotatably mounted in said housing, means on said spindle for rotatably holding a workpiece in operative relation with said grinding wheel, a master cam on said spindle, a follower roller for engaging the contour of said master cam, a cradle for supporting said housing and spindle for oscillation in response to rotation of said master cam against said follower roller, means for supporting said follower roller comprising a fixed support member, a depending arm pivotally attached to said fixed support member, said follower roller being rotatably mounted at one end of said arm, and a flexible connection between the other end of said arm and a point on said cradle above said spindle including a spring hinge at each end of said flexible connection.

4. In a machine for grinding non-cylindrical workpieces, a grinding wheel support, a grinding wheel rotatably mounted on said wheel support, a work support comprising a housing, a work drive spindle rotatably mounted in said housing, means on said spindle for rotatably holding a workpiece in operative relation with said grinding wheel, a master cam on said spindle, a follower roller for engaging the contour of said master cam, a cradle for supporting said housing and spindle for oscillation in response to rotation of said master cam against said follower roller, means for supporting said follower roller comprising a fixed support member, a depending arm pivotally attached to said fixed support member, said follower roller being rotatably mounted at one end of said arm, a member adjustable lengthwise on said arm, and a connection between said adjustable member and said cradle.

5. In a machine for grinding non-cylindrical workpieces, a grinding wheel support, means for advancing and retracting said wheel support relative to a workpiece, a grinding wheel rotatably mounted on said wheel support, a work support having means for rotatably supporting a workpiece in operative relation with said grinding wheel including a work drive spindle, a motor for driving said spindle, a cradle on said work support for rotatably supporting said spindle for oscillation relative to said grinding wheel, a master cam on said spindle, an arm pivotally mounted on said work support, a follower roller rotatably mounted on said arm for engaging the contour of said master cam, a member adjustable on said arm, and a connection between said adjustable member and said cradle.

6. In a grinding machine, a grinding wheel support, a grinding wheel rotatably mounted on said wheel support, means for advancing and retracting said wheel support relative to a workpiece, a work support having means for rotatably supporting a workpiece during a grinding operation including a work drive spindle, means for driving said spindle, means operable at the end of a grinding cycle for stopping said spindle in a first predetermined position, means rotatable with said spindle and having a stop portion, a stop member movable into and out of the path of said stop portion, and means operable in connection with stopping said spindle in said first predetermined position, for further rotating said spindle until said stop portion engages said stop member to stop said spindle in a second predetermined position.

7. In a machine for grinding non-cylindrical workpieces having peripherally spaced portions to be ground, a grinding wheel support, a grinding wheel rotatably mounted on said wheel support, means for advancing and retracting said wheel support relative to a workpiece, a work support having means for rotatably supporting a workpiece in operative relation with said grinding wheel including a work drive spindle, means operable before the workpiece has been ground to final size for advancing said wheel support by increments, and control means operable in timed relation with rotation of said spindle for determining the frequency of said increments.

8. In a machine for grinding non-cylindrical workpieces having peripherally spaced portions to be ground, a grinding wheel support, a grinding wheel rotatably mounted on said wheel support, means for advancing and retracting said wheel support relative to a workpiece, a work support having means for rotatably supporting a workpiece in operative relation with said grinding wheel including a work drive spindle, means operable before the workpiece has been ground to final size for advancing said wheel support by increments, control means operable in timed relation with rotation of said spindle for determining the frequency of said increments, and control means for actuating said increment advancing means operable only during the portion of rotation of said workpiece when said grinding wheel is out of contact with said peripherally spaced portions of said workpiece.

9. In a grinding machine for grinding non-cylindrical workpieces having two angularly spaced portions of substantially the same radius, a grinding wheel support, means for advancing and retracting said wheel support relative to a workpiece, a grinding wheel rotatably mounted on said wheel support, a work support having means for rotatably supporting a workpiece in operative relation with said grinding wheel including a work drive spindle, a gage movable into and out of contact with said workpiece, and means to hold said gage in position to engage only the portion of said workpiece being ground.

10. In a grinding machine for grinding non-cylindrical workpieces having two angularly spaced portions of substantially the same radius, a grinding wheel support, means for advancing and retracting said wheel support relative to a workpiece, a grinding wheel rotatably mounted on said wheel support, a work support having means for rotatably supporting a workpiece in operative relation with said grinding wheel including a work drive spindle, a gage movable into and out of contact with said workpiece, an electric circuit for controlling said advancing and retracting means, a first means operable when one of said portions is ground to size to close a part of said electric circuit, and a second means to complete said circuit when the other portion of said workpiece is to size to retract said wheel support.

11. In a grinding machine for grinding non-cylindrical workpieces having two angularly spaced portions of substantially the same radius, a grinding wheel support, means for advancing and retracting said wheel support relative to a workpiece, a grinding wheel rotatably mounted on said wheel support, a work support having means for rotatably supporting a workpiece in operative relation with said grinding wheel including a work drive spindle, a gage movable into and out of contact with said workpiece, an electric circuit for controlling said advancing and retracting means, a first means operable when one of said portions is ground to size to close a part of said electric circuit, said first means being adapted to open said closed part of said circuit if the second portion of said workpiece is not to size.

12. In a grinding machine for grinding non-cylindrical workpieces having two angularly spaced portions of substantially the same radius, a grinding wheel support, means for advancing and retracting said wheel support relative to a workpiece, a grinding wheel rotatably mounted on said wheel support, a work support having means for rotatably supporting a workpiece in operative relation with said grinding wheel including a work drive spindle, a gage movable into and out of contact with said workpiece, and means operable by said gage only when both of said angularly spaced portions of said workpiece have been ground to the desired size for retracting said wheel support.

13. In a machine for grinding non-cylindrical workpieces having peripherally spaced portions to be ground, a grinding wheel support, a grinding wheel rotatably mounted on said wheel support, feeding means for advancing and retracting said wheel support relative to a workpiece, a work support comprising a housing, a work drive spindle rotatably mounted in said housing, means for rotating said spindle, a gage movable toward and from said workpiece, an electric circuit for controlling said feeding means, a contact in said circuit adapted to be actuated by said gage when said workpiece is oversize, another contact in said circuit adapted to be opened and closed in time with rotation of said workpiece, said first mentioned contact remaining closed only when all of said spaced portions of said workpiece are ground to size and co-acting with said second mentioned contact to retract said grinding wheel.

14. In a machine for grinding non-cylindrical workpieces having peripherally spaced portions to be ground, a grinding wheel support, a grinding wheel rotatably mounted on said wheel support, feeding means for advancing and retracting said wheel support relative to a workpiece, a work support comprising a housing, a work drive spindle rotatably mounted in said housing, means for rotating said spindle, a gage movable toward and from said workpiece, an electric circuit for controlling said feeding means, a contact in said circuit adapted to be actuated by said gage when said workpiece is oversize, another contact in said circuit adapted to be opened and closed in time with rotation of said workpiece, said first mentioned contact remaining closed only when all of said spaced portions of said workpiece are ground to size and co-acting with said second mentioned contact to retract said grinding wheel when said workpiece is in a predetermined angular position.

15. In a grinding machine for grinding non-cylindrical workpieces having two angularly spaced portions of substantially the same radius, a grinding wheel support, means for advancing and retracting said wheel support relative to a workpiece, a grinding wheel rotatably mounted on said wheel support, a work support having means for rotatably supporting a workpiece in operative relation with said grinding wheel including a work drive spindle, a gage comprising a transducer, control means for varying the size of workpieces, and means operable by said gage only when both of said angularly spaced portions of said workpiece have been ground to the desired size for retracting said wheel support.

16. In a machine for grinding non-cylindrical workpieces having peripherally spaced portions to be ground, a grinding wheel support, a grinding wheel rotatably mounted on said wheel support, feeding means for advancing and retracting said wheel support relative to a workpiece, a work support comprising a housing, a work drive spindle rotatably mounted in said housing, means for rotating said spindle, a gage movable toward and from said workpiece, an electric circuit for controlling said feeding means, means actuated by said gage for opening said circuit when said workpiece is oversize, means operable in timed relation with rotation of said workpiece for opening and closing a contact in said circuit, and means for completing said circuit only when all of said peripherally spaced portions of said workpiece are ground to size, to retract said grinding wheel.

17. In a machine for grinding automotive pistons having a relatively rigid head portion, relatively flexible, peripherally spaced skirt portions, slots separating said head and skirt portions, a grinding wheel support, a grinding wheel rotatably mounted on said wheel support, a work support comprising a housing, a work drive spindle rotatably mounted in said housing, means for rotatably supporting a piston at one end only for grinding said skirt portions comprising a chuck on said spindle, said chuck having a plurality of jaws angularly arranged to engage and grip the head portion of said piston only on the portion of said head adjacent said slots.

18. In a machine for grinding automotive pistons having a relatively rigid head portion, relatively flexible, peripherally spaced skirt portions, slots separating said head and skirt portions, a grinding wheel support, a grinding wheel rotatably mounted on said wheel support, a work support comprising a housing, a work drive spindle rotatably mounted in said housing, means for rotatably supporting a piston at one end only for grinding said skirt portions comprising a chuck on said spindle, a plurality of jaws on said chuck angularly arranged to engage the head portion of said piston in positions corresponding to the angular positions of said skirt portions.

19. In a machine for grinding automotive pistons having a relatively rigid head portion, relatively flexible, peripherally spaced skirt portions, slots separating said head and skirt portions, a grinding wheel support, a grinding wheel rotatably mounted on said wheel support, a work support comprising a housing, a work drive spindle rotatably mounted in said housing, means for rotatably supporting a piston at one end only for grinding said skirt portions comprising a chuck on said spindle, said chuck having means for gripping the head portion of said piston in the same angularly spaced positions as said slots.

20. In a machine for grinding automotive pistons having a relatively rigid head portion, relatively flexible, peripherally spaced skirt portions, slots separating said head and skirt portions, a grinding wheel support, a grinding wheel rotatably mounted on said wheel support, a work support comprising a housing, a work drive spindle rotatably mounted in said housing, a means for rotatably supporting a piston at one end only for grinding said skirt portions.

21. In a machine for grinding non-cylindrical workpieces having peripherally spaced portions to be ground, a grinding wheel support, a grinding wheel rotatably mounted on said wheel support, feeding means for advancing and retracting said wheel support relative to a workpiece, a work support comprising a housing, a work drive spindle rotatably mounted in said housing, means for rotating said spindle, a gage movable toward and from said workpiece, an electric circuit for controlling said feeding means, a contact in said circuit adapted to be opened by said gage when said workpiece is oversize, another contact in said circuit operable in timed relation with rotation of said workpiece and adapted to be closed each time said first mentioned contact is opened, said first mentioned contact remaining closed when a workpiece is ground to size and co-acting with said second mentioned contact to complete said electric circuit to retract said grinding wheel.

22. In a machine for grinding non-cylindrical workpieces having peripherally spaced portions to be ground, a grinding wheel support, a grinding wheel rotatably mounted on said wheel support, feeding means for advancing and retracting said wheel support relative to a workpiece, a work support comprising a housing, a work drive spindle rotatably mounted in said housing, means for rotating said spindle, a gage movable toward and from said workpiece and having a feeler for engaging said workpiece, a cylindrical reference ring rotatable with said spindle, and means on said gage for engaging said reference ring to restrict contact between said workpiece and said feeler to said peripherally spaced portions.

23. In a machine for grinding non-cylindrical workpieces, a grinding wheel support, a grinding wheel rotatably mounted on said wheel support, a work support comprising a housing, a work drive spindle rotatably mounted in said housing, means on said spindle for rotatably holding a workpiece in operative relation with said grinding wheel, a master cam on said spindle, a follower roller for engaging the contour of said master cam, a cradle for supporting said housing and spindle for oscillation in response to rotation of said master cam against said follower roller, a means for supporting said roller comprising a fixed support member, a depending arm pivotally attached to said fixed support member at a point to provide a substantial reduction ratio between said master cam and a workpiece, said roller being rotatably mounted at one end of said arm, a member adjustable lengthwise on said arm, and a connection between said adjustable member and said cradle.

24. In a grinding machine for grinding non-cylindrical workpieces having two angularly spaced portions of substantially the same radius, a grinding wheel support, means for advancing and retracting said wheel support relative to a workpiece, a grinding wheel rotatably mounted on said wheel support, a work support having means for rotatably supporting a workpiece in operative relation with said grinding wheel including a work drive spindle, a gage comprising a transducer, control means for varying the size of workpieces, and means operable by said gage when said angularly spaced portions of said workpiece have been ground to the desired size for retracting said wheel support.

References Cited by the Examiner

UNITED STATES PATENTS

| | | | |
|---|---|---|---|
| 1,815,049 | 7/1931 | Cole | 51—165.04 |
| 2,201,218 | 5/1940 | Balsiger et al. | 51—165.04 X |
| 2,599,987 | 6/1952 | Green | 51—101 |

LESTER M. SWINGLE, *Primary Examiner.*